(12) United States Patent
Chebolu et al.

(10) Patent No.: US 9,930,074 B2
(45) Date of Patent: Mar. 27, 2018

(54) METHOD AND APPARATUS FOR CONTROLLING POWER OUTPUT FROM AN ELECTRONIC DEVICE TO AN EXTERNAL ELECTRONIC DEVICE

(71) Applicant: Samsung Electronics Co., Ltd., Gyeonggi-do (KR)

(72) Inventors: Praveen Chebolu, Gyeonggi-do (KR); Ganesh Babu Kamma, Bangalore (IN); Jai-Dong Kim, Gyeonggi-do (KR); Jae-Won Kim, Gyeonggi-do (KR); Hyeun-Mok Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 434 days.

(21) Appl. No.: 14/799,159

(22) Filed: Jul. 14, 2015

(65) Prior Publication Data

US 2016/0226925 A1  Aug. 4, 2016

(30) Foreign Application Priority Data

Jan. 30, 2015  (KR) ........................ 10-2015-0015561

(51) Int. Cl.
*H04L 29/06* (2006.01)
*H04M 1/253* (2006.01)
(52) U.S. Cl.
CPC ...... *H04L 65/1069* (2013.01); *H04L 65/1006* (2013.01); *H04M 1/2535* (2013.01)

(58) Field of Classification Search
CPC ............ H04L 65/1069; H04L 65/1006; H04M 1/2535
See application file for complete search history.

(56) References Cited

U.S. PATENT DOCUMENTS

| 2009/0113460 | A1* | 4/2009 | Parrish ................... H04L 69/18 719/328 |
| 2012/0314650 | A1* | 12/2012 | Medapalli ........... H04W 52/028 370/328 |
| 2013/0301529 | A1 | 11/2013 | Lindsay et al. |
| 2013/0308620 | A1* | 11/2013 | Bharadwaj ............ H04W 40/02 370/338 |
| 2014/0301258 | A1* | 10/2014 | Belghoul .......... H04W 52/0209 370/311 |
| 2015/0043453 | A1* | 2/2015 | Hegarty .............. H04L 65/1016 370/329 |

* cited by examiner

*Primary Examiner* — Larry Donaghue
(74) *Attorney, Agent, or Firm* — The Farrell Law Firm, P.C.

(57) ABSTRACT

A mobile terminal for supporting Rich Communication Suite (RCS) and Voice Over Long Term Evolution (VoLTE) based services is provided. The mobile terminal includes an application processor that enables a first layer of a first session connection protocol stack and transmits signaling for an RCS service to a modem processor; and the modem processor that comprises a second session connection protocol stack for connecting a session, and that transmits, to a communication network, the signaling for the RCS service transmitted through the first layer.

20 Claims, 12 Drawing Sheets

METHOD AND APPARATUS FOR CONTROLLING POWER OUTPUT FROM AN ELECTRONIC DEVICE TO AN EXTERNAL ELECTRONIC DEVICE

PRIORITY

This application claims priority under 35 U.S.C. § 119(a) to Korean Application Serial No. 10-2015-0015561, which was filed in the Korean Intellectual Property Office on Jan. 30, 2015, the entire content of which is incorporated herein by reference.

BACKGROUND

1. Field of the Invention

The present disclosure relates to a method and a configuration of a terminal for supporting a Rich Communication Suite (RCS) and a Voice Over Long Term Evolution (VoLTE) service in a terminal.

2. Description of the Related Art

Recently, due to the growth of Long Term Evolution (LTE) networks, the introduction of User Equipment (UE) _that can access LTE networks to use data services has been accelerated. A VoLTE service, which supports voice calls using an LTE network, has also recently been developed. The VoLTE service, which is a Voice over Internet Protocol (VoIP) service using an LTE network, provides excellent sound quality, as compared to voice communication services using a circuit network according to the related art. Various additional services, including video calls with a high level of picture quality, as well as voice communication services, can also be realized through the VoLTE service.

Due to the development of mobile communications, the users of UEs currently use UEs for various purposes, in addition to simple voice calls. Accordingly, Global System for Mobile Communications Association (GSMA) has suggested a Rich Communication Suite (RCS) service, which provides various communication features to the UE users through communication networks. The RCS service integrates images, Short Message Services (SMSs), chatting, file sharing, as well voice communications, through communication networks, in a manner such that these services may be used collectively. For example, the RCS service may provide an enriched call feature for sharing multimedia files, such as videos or photos during a voice call, an enhanced phonebook feature for acquiring information of a communication counterpart registered in an address book in real time, and an enriched messaging feature for sharing files during chatting. Implementation of the RCS service has started in Europe and is scheduled to expand worldwide to other areas including Korea and the Americas.

Accordingly, studies with respect to UEs that may provide an RCS service together with a VoLTE service have been expanded.

SUMMARY

An aspect of the present disclosure is to provide a UE that provides a VoLTE/RCS service and a method of providing a VoLTE/RCS service in the UE.

According to an aspect of the present disclosure, a mobile terminal for supporting Rich Communication Suite (RCS) and Voice Over Long Term Evolution (VoLTE) based services is provided. The mobile terminal includes an application processor that enables a first layer of a first session connection protocol stack and transmits signaling for an RCS service to a modem processor; and the modem processor that comprises a second session connection protocol stack for connecting a session, and that transmits, to a communication network, the signaling for the RCS service transmitted through the first layer.

According to another aspect of the present disclosure, a method of supporting Rich Communication Suite (RCS) and VoLTE based services. The method includes enabling, by an application processor, a first layer of a first session connection protocol stack; transmitting, by the application processor, to a modem processor, signaling for an RCS service; and transmitting, by the modem processor, the signaling for the RCS service to a communication network through a second session connection protocol stack for connecting a session.

According to another aspect of the present disclosure, a chipset for supporting Rich Communication Suite (RCS) and Voice Over Long Term Evolution (VoLTE) based services is provided. The chipset includes an application processor that enables a first layer of a first session connection protocol stack and transmits signaling for an RCS service to a modem processor; and the modem processor that comprises a second session connection protocol stack for connecting a session, and that transmits, to a communication network, the signaling for the RCS service transmitted through the first layer.

According to another aspect of the present disclosure, an application processor for supporting Rich Communication Suite (RCS) and Voice Over Long Term Evolution (VoLTE) based services is provided. The application processor includes a user interface that receives a user input and transmits an instruction to a first layer of a first session connection protocol stack according to the received input; and the first layer of a first session connection protocol stack that receives the instruction and transmits signaling for an RCS service to a second session connection protocol stack of a modem processor according to the received instruction.

According to another aspect of the present disclosure, a method of supporting Rich Communication Suite (RCS) and VoLTE based services by an application processor is provided. The method includes enabling, by the application processor, a first layer of a first session connection protocol stack of the application processor; and transmitting, by the application processor, to a second session connection protocol stack of a modem processor, signaling for an RCS service.

According to another aspect of the present disclosure, a modem processor for supporting Rich Communication Suite (RCS) and Voice Over Long Term Evolution (VoLTE) based services is provided. The modem processor includes a second session connection protocol stack for receiving, from a first layer of a first session connection protocol stack of an application processor, signaling for an RCS service, and connecting a session according to the received signaling; and a Transmission Control Protocol/Internet Protocol (TCP/IP) stack for transmitting, to a communication network, the signaling for the RCS service transmitted through the first layer.

According to another aspect of the present disclosure, a method of supporting Rich Communication Suite (RCS) and VoLTE based services by a modem processor is provided. The method includes receiving, by a second session protocol stack of the modem processor, from a first layer of a first session connection protocol stack of an application processor, signaling for an RCS service; and transmitting, by the modem processor, the signaling for the RCS service to a communication network through the second session connection protocol stack for connecting a session.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS

Figure 1:
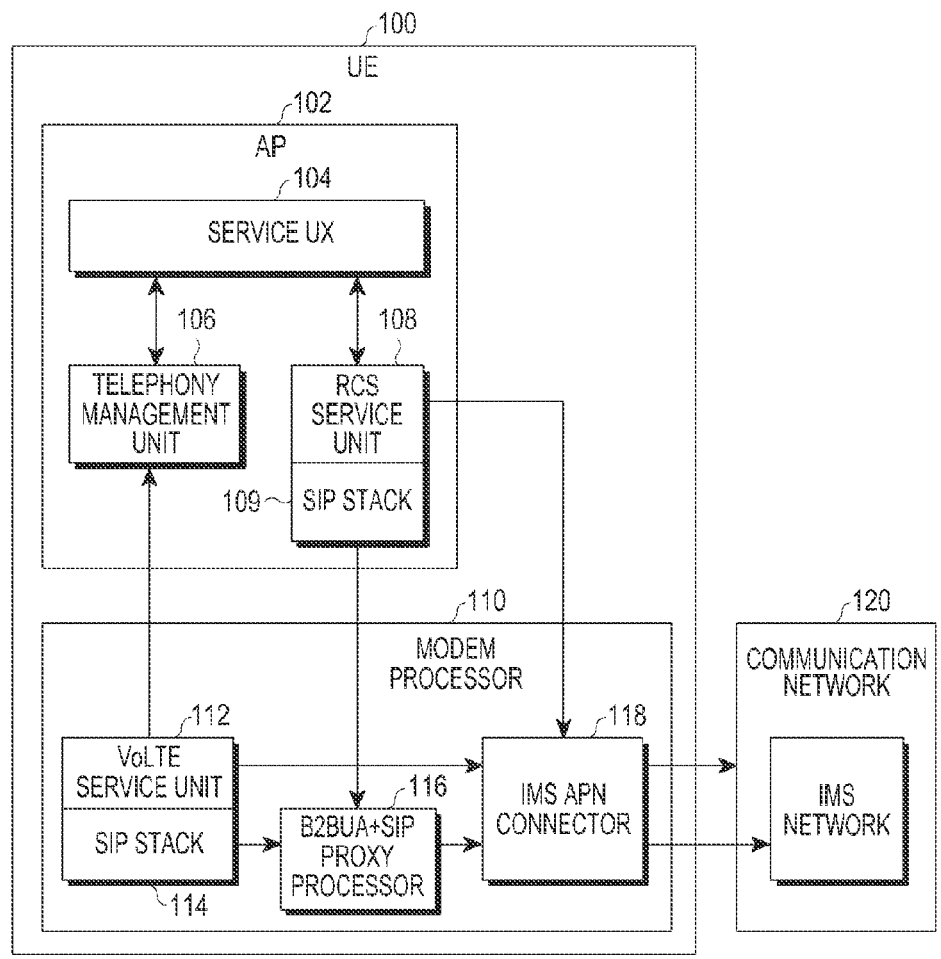
FIG. 1 is a diagram illustrating an example of a configuration of a UE according to a plan for processing RCS/VoLTE services in the UE.

Hereinafter, various embodiments of the present disclosure will be described in detail with reference to the accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs. Therefore, the definitions of the terms should be determined based on the contents throughout the specification.

As a representative example, plans for processing Rich Communication Suite (RCS) services together with VoLTE services in a User Equipment (UE) have been discussed in the Global System for Mobile Communication Association (GSMA) Standard. Among these plans, a first example corresponds to a Back to Back User Agent (B2BUA) method in which a UE has two Session Initiation Protocol (SIP) stacks.

FIG. 1 is a diagram illustrating an example of a configuration of UE according to a plan for processing RCS/VoLTE services in the UE.

Referring to FIG. 1, a UE 100 includes an Application Processor (AP) 102 and a modem processor 110. The AP 102 includes a service User Experience 104, a telephony manager 106, an RCS service unit 108, and an SIP stack 109. The SIP stack 109 is attached to the RCS service unit 108 and processes RCS services.

The modem processor 110 includes a VoLTE service unit 112, an SIP stack 114, a B2BUA SIP proxy processor 116, and an IP Multimedia Subsystem (IMS) connector 118. The SIP stack 114 attached to the VoLTE service unit 112 may process all services that will be processed by the UE 100, using VoLTE/Short message Service (SMS) services and a B2BUA.

In UE 100 illustrated in FIG. 1, which is configured according to a plan for processing RCS/VoLTE services during handover processing from Wi-Fi to a mobile communication network, such as LTE/$2^{nd}$ Generation (2G)/$3^{rd}$ Generation (3G), or vice versa, the UE 100 includes two SIP stack structures 109 and 114, and accordingly, synchronization is performed on the UE based on the SIP stack structures. The two SIP stacks 109 and 114 use a Transport Control Protocol (TCP)/Internet Protocol (IP) stack of the modem processor 110. Accordingly, in the SIP stack 109 of the AP 102, a security protocol reflects an update of the TCP/IP stack in the modem processor 110 for Internet Protocol security (IPsec) associations. Furthermore, the interface of the SIP stack 109 of the AP 102 becomes more complex as the TCP/IP stack of the modem processor 110 is used. Therefore, the first plan increases costs for structural efficiency, and a new SIP B2BUA and a proxy feature are ideologically integrated in hardware of the UE 100 in an Operating System (OS).

According to a second plan for processing RCS/VoLTE services, both RCS and VoLTE services are processed through a single SIP stack of an AP. In this example, since a call setting time for VoLTE acts as a delay and a modem processor indicates a state of a Handover (HO) to the AP, a Single Radio Voice Call Continuity (SRVCC) HO is delayed, and then a service provided by the AP is switched/ For example, VoLTE is switched to a Circuit Switched (CS) call path. In an emergency call setting, when an INVITE failure occurs, a Circuit Switched Fallback (CSFB) call is delayed due to an SIP stack for processing VoLTE services by the AP. Furthermore, a handover from a VoLTE service to a Voice over HSPA (VoHSPA) or Reverse Single Radio Voice Call Continuity (rSRVCC) is also delayed.

Figure 2:
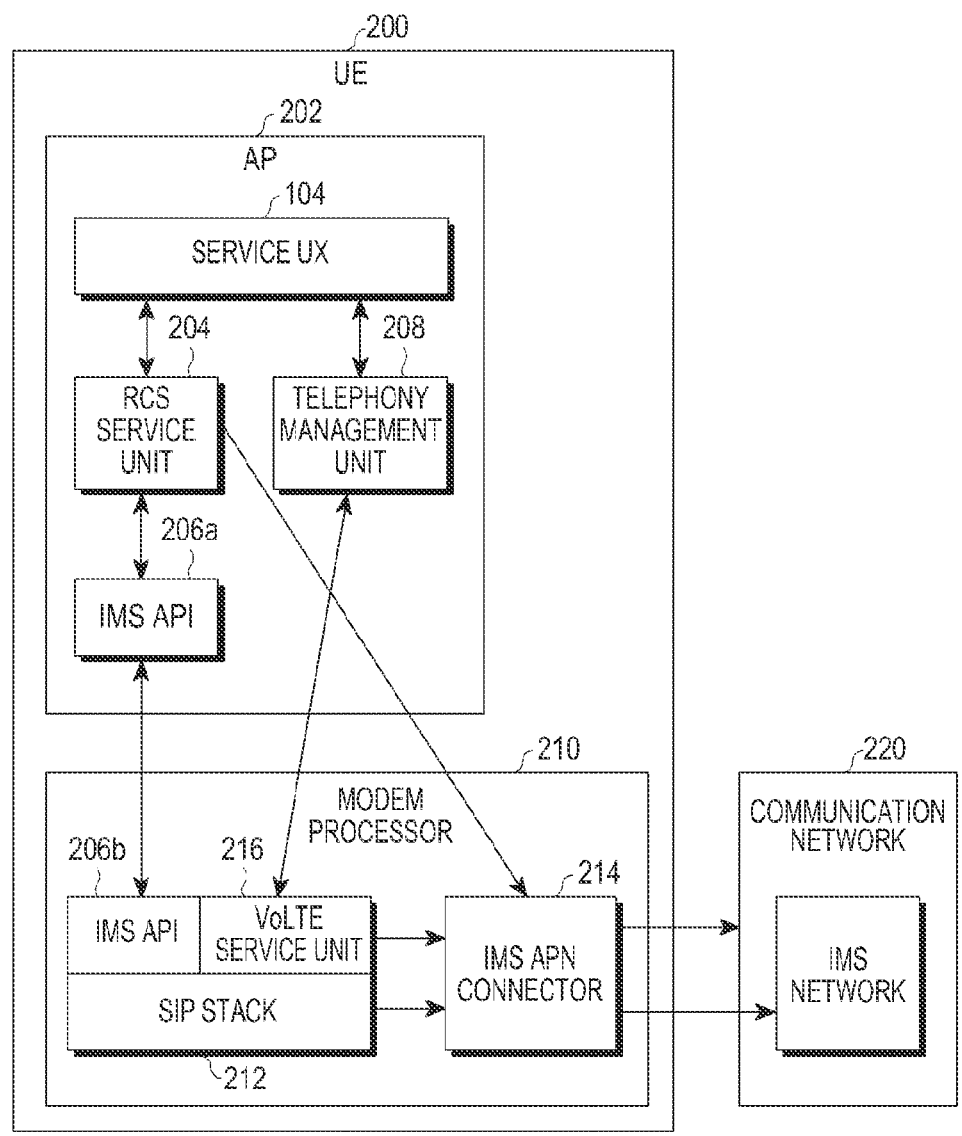
FIG. 2 is a diagram illustrating an example of a configuration of a UE according to another plan for processing RCS/VoLTE services in the UE.

According to a third plan for processing RCS/VoLTE services in a UE, a modem processor has a single SIP stack and an IMS Application Program Interface (API) approach is used between an AP and the modem processor. FIG. 2 illustrates an example of a configuration of UE according to the third plan for processing RCS/VoLTE services in a UE.

Referring to FIG. 2, a UE 200 includes an AP 202 and a modem processor 210. In contrast to the UE 100 of FIG. 1, in FIG. 2, an RCS service 204 of the AP 202 does not include an SIP stack, and the RCS service unit 204 performs communications for RCS services with an IMS API 206b of the modem processor 210 through an IMS API 206a included in the AP 202. Meanwhile, the modem processor 210 includes an SIP stack 212 having a full stack structure illustrated in FIG. 3, and a VoLTE service unit 216 that performs communications for VoLTE services with the IMS API 206*a* of the AP 202 through the IMS API 206*b* of the modem processor 210. The SIP stack 212 of the modem processor 210 performs all processing for the RCS and VoLTE services. Due to this configuration, the capability of the modem processor 210 may deteriorate, parsers required to process use data, such as an eXtensible Markup Language (XML), an XML Configuration Access Protocol (XCAP) and a Service Delivery Platform (SDP) for applications for an RCS service are necessary, and costs due to encoding/decoding of SIP bodies may increase.

Meanwhile, according to a GSMA specification, an RCS service acts as an inter-operator for communication services based on an IMS, and most operators have developed towards incorporating an RCS feature for settling issues for today's Over the Top (OTT) applications. The RCS features may include, for example, person-to-person chatting, group chatting, transmission of files, image/video sharing, IP-voices, IP-videos, and improved phonebooks. If the UE supports a VoLTE service, the IP-voice and video services of the RCS features may be fully replaced by VoLTE.

The VoLTE appeared as a solution preferred for supporting real-time voice traffics in all IP network-based communication environments. Accordingly, the VoLTE is a VoIP service based standard IMS based on Multimedia Telephony (MMTel) and designed to replace an existing Circuit Switched (CS) voice.

Main features of the RCS service may include a performance discovery that allows common services that are usable between two users to be identified. The capability discovery is performed for contacts whenever the user clicks the corresponding contacts. Accordingly, when the UE supports both the RCS and VoLTE services, the capability discovery acts as a main parameter to maintain the capabilities of a battery and a device.

Furthermore, when multiple registrations for processing both the RCS and VoLTE services are generated for the same device, traffic towards a network increases and power consumption of the battery also increases. Therefore, the operator requires a single registration from the user when the RCS and VoLTE services are processed.

Figure 3:
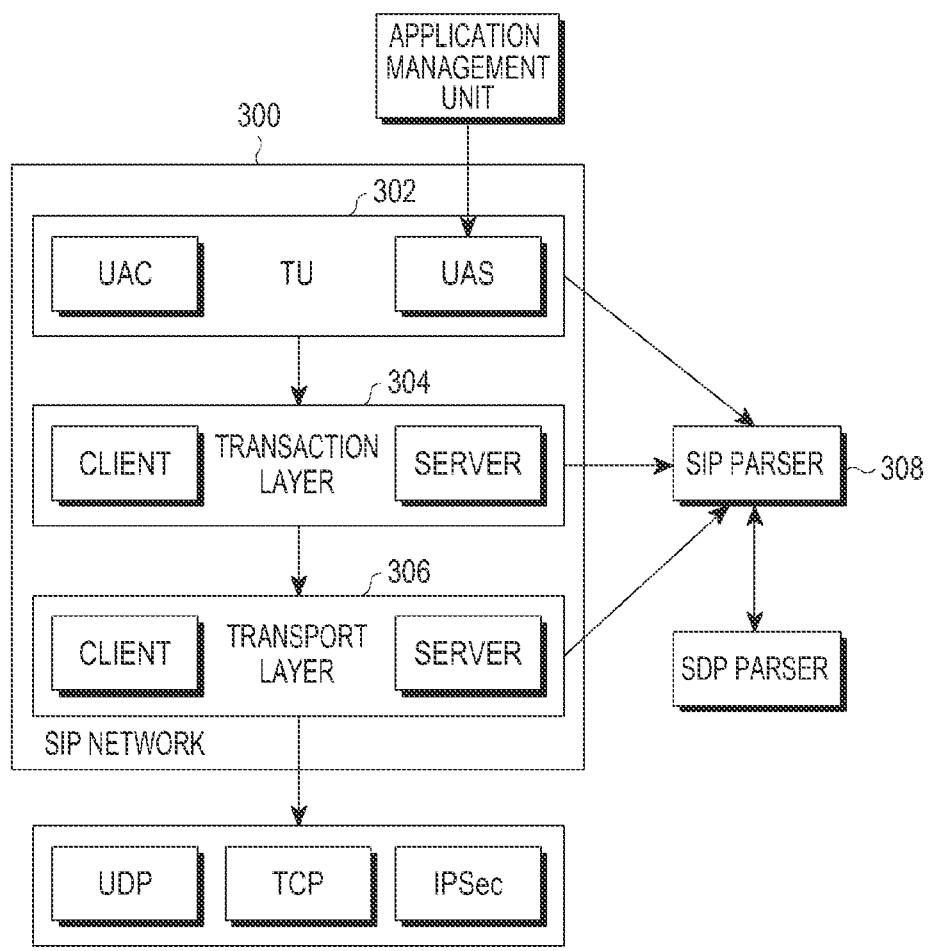
FIG. 3 is a diagram illustrating an example of a structure of an SIP stack for processing RCS/VoLTE services in a UE.

FIG. 3 is a diagram illustrating an example of a structure of an SIP stack for processing RCS/VoLTE services in a UE.

Referring to FIG. 3, an SIP stack 300 includes a Transaction User (TU) layer 302 that processes requests for all applications and establishes communication methods for the all applications and establishes a measurement. Here, a "measurement" refers to Transaction User takes care of all the functionalities required for that application (RCS or VoLTE). The header fields of the TU 302 embody corresponding applications, and if a body (an SDP, an XML, an XCAP, etc.) of the TU 302 exists, the header fields of the TU 302 will be embodied.

The next layer of the TU 302 is a transaction layer 304. The transaction layer 304 processes contracts for each of a client and a server and process call ID generation related header fields from VIA branch header tags. The lower layer of the SIP stack 300 is a transaction layer 306, and determines a TCP/IP stack used to transmit an SIP message to a network. The transaction layer 306 updates some parts of a VIA header field together with details of a suitable transport. If SIP headers are acquired through the layers, the SIP parsers 308 encode and decode the corresponding SIP headers.

Hereinafter, according to an embodiment of the present disclosure, a configuration of a UE that includes an SIP stack being perfect for the modem processor and includes a mini SIP stack in which only a TU layer is enabled for an RCS service in the SIP stack by the AP is suggested, and a method of processing RCS services and VoLTE services in the UE is also suggested.

Figure 4:
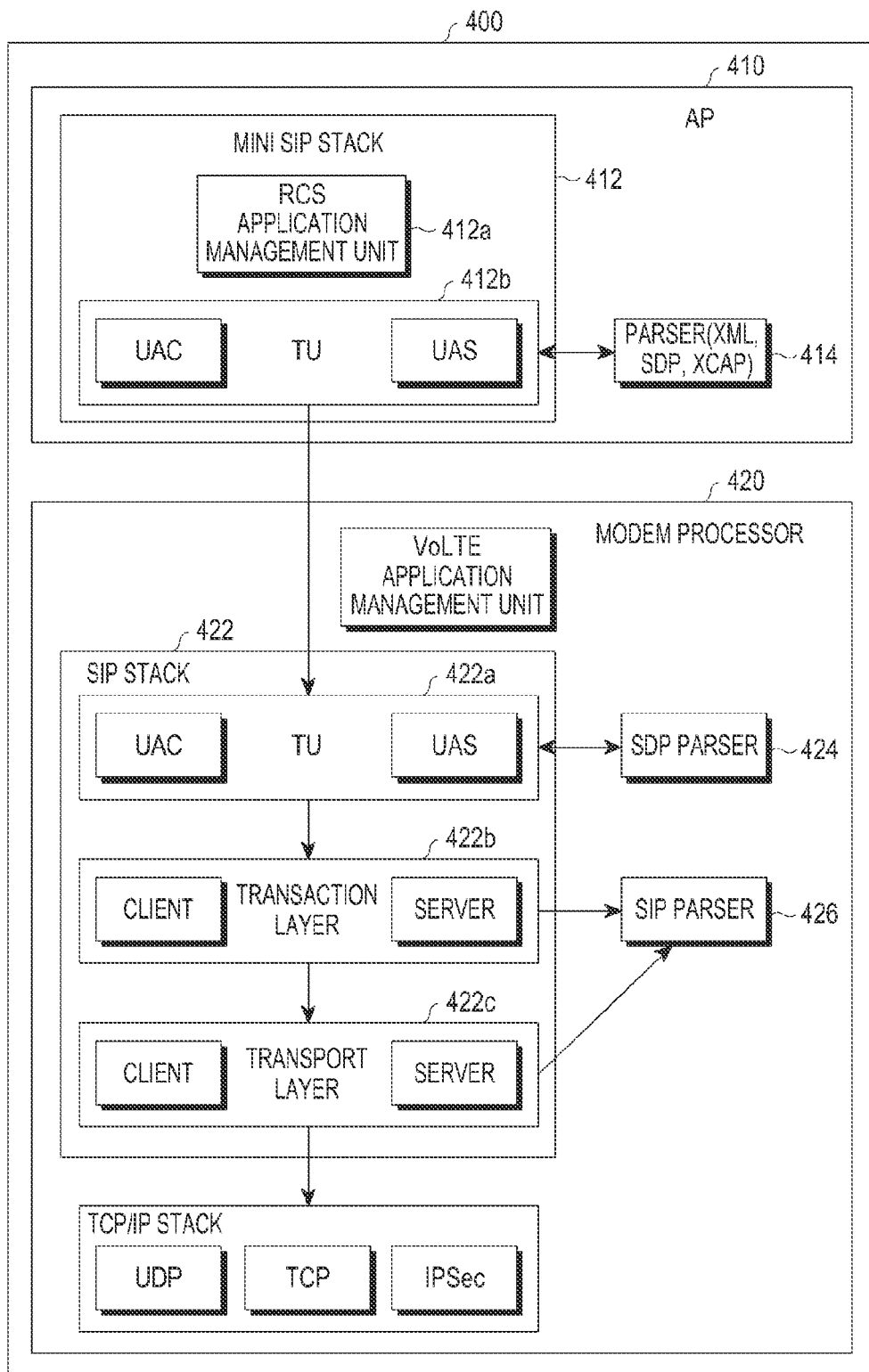
FIG. 4 is a diagram illustrating an example of a configuration of a UE according to an embodiment of the present disclosure.

FIG. 4 is a diagram illustrating an example of a configuration of a UE according to an embodiment of the present disclosure.

Referring to FIG. 4, a UE 400 includes an AP 410 and a modem processor 420. The AP 410 includes, for example, a mini SIP stack 412 in which only a TU layer of an SIP stack is enabled, and a parser 414. The mini SIP stack 412 processes RCS services.

Next, the modem processor 420 includes an SIP stack 422 having a full stack structure illustrated in FIG. 3 The SIP stack 422 includes a Transaction User (TU) layer 422*a*, a Transaction Layer (TL) 422*b*, and transport layer 422*c*. The SIP stack 422 of the modem processor 420 processes all the VoLTE services and RCS services.

As illustrated in FIG. 4, in the UE 400, according to the embodiment of the present disclosure, if LTE or Wi-Fi is used for the IMS, a single SIP stack (i.e., the SIP stack 422) will be used. Together with the SIP stack 422 of the modem processor 420, the RCS features are processed through the remaining SIP layers in the modem processor 420, that is, the transaction layer 422*b* and the transport layer 422*c*, together with the SIP mini stack 412 in the AP 410 (i.e., the TU layer 412*b*). Accordingly, the capabilities of the battery and the device can be maintained by allowing a single registration without using an existing B2BUA. For the RCS features, the AP 410 processes a database related to all RCS characteristics and the parser 414 decodes and encodes the SIP body from the TU layer 412*b* of the mini SIP stack 412.

For a path of a VoLTE call, the modem processor 420 processes a path for perfect SIP signaling and audio data. As all of the SIP signaling in the modem processor 420 is processed, the process of setting of a VoLTE call becomes faster, and the Srvcc or rSrvcc also becomes faster than the SIP signaling performed in the AP 410.

According to an embodiment of the present disclosure, when the UE is connected to WiFi, the modem processor 420 is completely turned off, if the database is synchronized through the SIP stack 422 of the modem processor 420, and all RCS features or IMS features through Wi-Fi are processed through the mini SIP stack 412 of the AP 410.

Meanwhile, the mini SIP stack 412 of the UE 400 according to the embodiment of FIG. 4 may enable only the TU layer, based on the requirements of the operator or enable a perfect SIP stack form. First, a single Access Point Number (APN) is necessary for the RCS and VoLTE services. For example, when the UE 400 accesses an LTE based communication system, the TU layer 422*a* of the modem processor 420 transmits an SIP message from the modem processor 420 to the TU layer 412*c* of the mini SIP stack 412 of the AP 410. In the modem processor 420, the TU layer 422*a* will transparently process the SIP messages processed by the AP 410.

Meanwhile, in the present example, it is assumed that two separated Access Point Numbers (APNs) are used for the RCS and VoLTE services. For example, it is assumed that a Wi-Fi mode is enabled in a situation in which the UE 400 is connected to an LTE based communication system. Then, the AP 410 is able to process the RCS services and the SIP messages using a perfect SIP stack, and in the modem processor 420, the SIP stack 422 is able to stop processing of the SIP messages and process the VoLTE services.

Hereinafter, for convenience of description, the UE described in the specification will be described with the assumption of FIG. 4. Accordingly, an SIP stack of the modem processor according to an embodiment of the present disclosure performs a control operation for the AP as a master. The mini SIP stack 412 of the AP 410 is operated like a slave under the control of the master.

Figure 5:
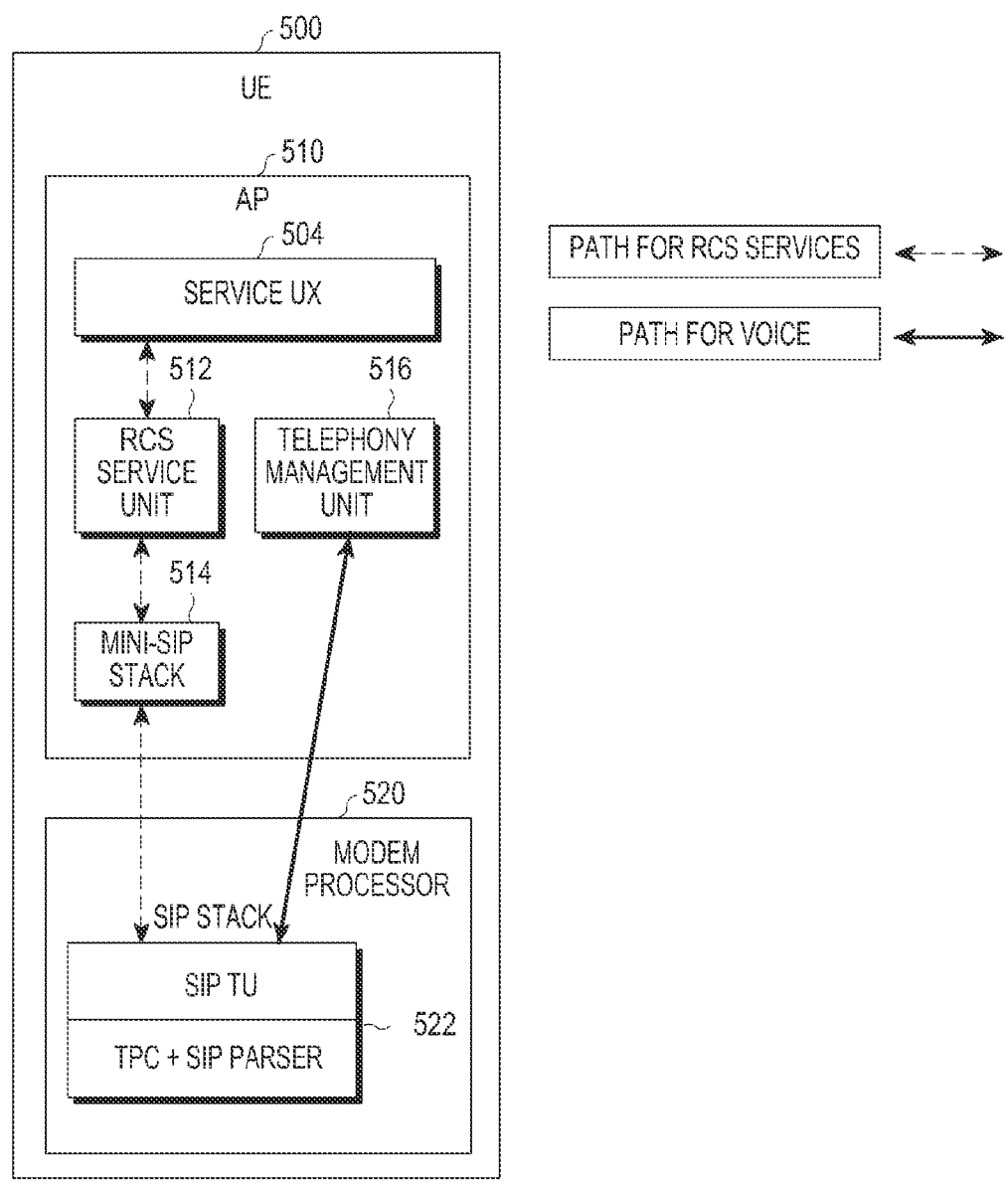
FIG. 5 is a diagram illustrating an example of a high level structure of a UE according to an embodiment of the present disclosure.

FIG. 5 is a diagram illustrating an example of a high level structure of a UE according to an embodiment of the present disclosure.

Referring to FIG. 5, a UE 500 includes an AP 510 and a modem processor 520. The AP 510 includes a service User eXperience (UX) 504, an RCS service unit 512, a mini SIP stack 514, and a telephony management unit 516. The mini SIP stack 514 corresponds to a state in which only a TU layer is enabled in an SIP stack. The modem processor 520 includes an SIP stack 522.

The embodiment of FIG. 5 utilizes a direct Inter-Process Communication (IPC) between a TU layer of the mini SIP stack 514 of the AP 510 and a TU layer of the modem processor 520, to avoid a delay that may be generated between mutual layers of the AP 510 and the modem processor 510. The IPC corresponds to a communication between the AP 510, the modem processor 520, and a shared memory area that exists between the AP 510 and the modem processor 520. Accordingly, the UE 500 according to the embodiment of FIG. 5 performs an IPC communication on a path for a voice communication, as well as on a path for the RCS services. Technologies for processing the telephony management unit 516 through the IPC communication and existing telephony services through a TU layer of the SIP stack 522 may be used, and a separate suggestion for processing telephony services is not required.

Figure 6:
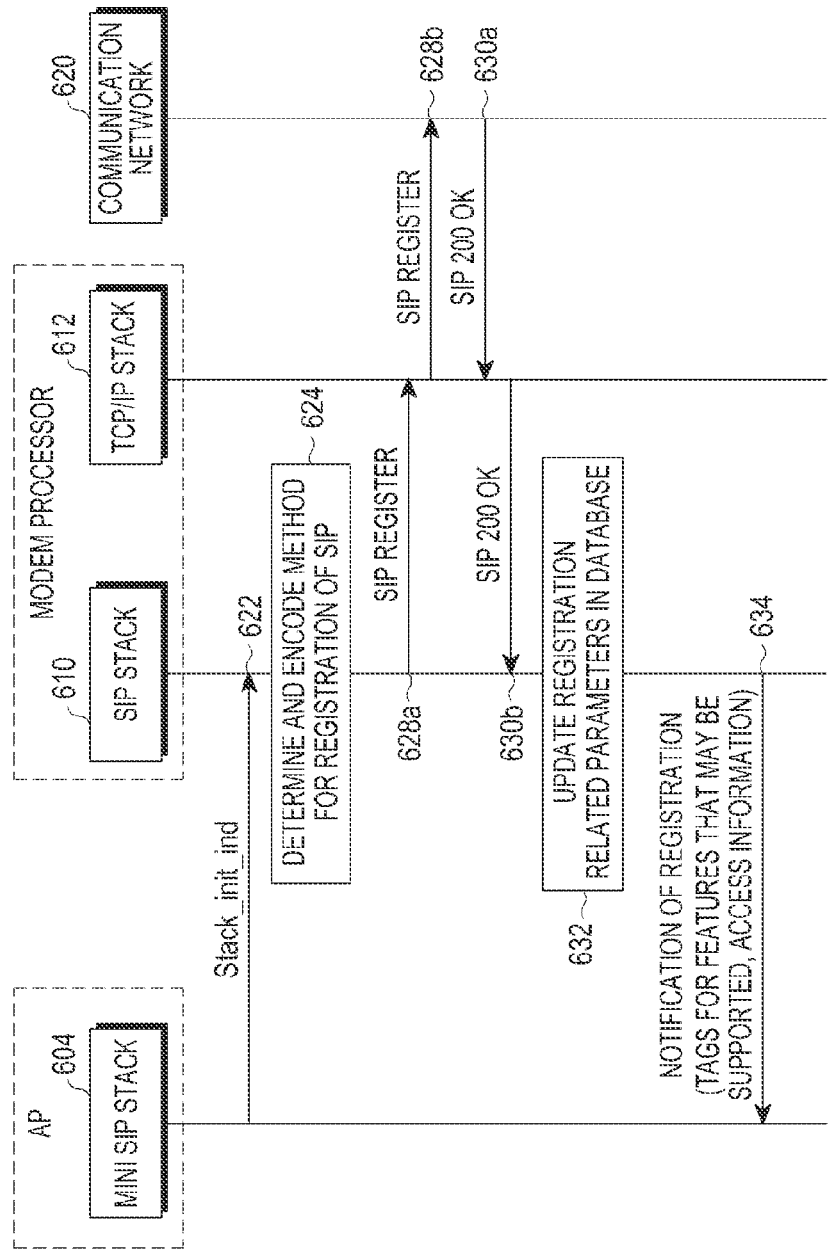
FIG. 6 is a diagram illustrating an example of an operation of performing a single IMS registration by a UE that supports an RCS/VoLTE service according to an embodiment of the present disclosure.

FIG. 6 is a flowchart illustrating an example of an operation of performing a single IMS registration by a UE that supports an RCS/VoLTE service according to an embodiment of the present disclosure. In the present example according to FIG. 6, the UE uses a mini SIP stack structure in an AP as in the embodiment of FIG. 4.

Referring to FIG. 6, in step 622, the mini SIP stack 604 of the AP transmits Stack_Init_Ind including feature tags supported by the AP and contact information to the SIP stack 610 of the modem processor. The feature tags may represent services that will provide an instruction to the modem processor 610 to request registration of CS features, for example.

In step 624, the SIP stack 610 of the modem processor combines the feature tag of the AP and features supported by the SIP stack 610 to determine a method for registration of an SIP. In the present example, the method for registration of an SIP includes an operation of determining authentication, Ipsec associations. And in step 624, the SIP stack 610 of the modem processor encodes the method for registration of an SIP through the SIP parser. In steps 628a and 628b, the SIP stack 610 of the modem processor transmits an SIP REGISTER message that requests registration of an SIP to the network 620 through the TCP/IP stack 612. The network 620 may be a communication system that provides an SIP based IMS service to the UE in which the AP is installed, for example, the mobile communication network (an LTE based communication network, etc.). Here, the SIP REGISTER message may include subscriber information of the UE in which the AP 602 is installed.

Thereafter, if the network 620 registers the UE in which the AP is installed, a response to the SIP REGISTER message is transmitted to the SIP stack 610 of the modem processor through the TCP/IP stack 612, using a 200ok message in steps 630a and 630b. In the present example, the 200ok message may include the registration related parameters. Accordingly, in step 632, the SIP stack 610 of the modem processor updates the registration related parameters in a database. In steps 634, the SIP stack 610 of the modem processor transmits a registration notification including the parameters to the AP through the mini SIP stack 604 of the AP. Similarly, the mini SIP stack 604 of the AP that received the parameters updates the registration related parameters.

As illustrated in FIG. 6, an SIP registration procedure according to an embodiment of the present disclosure is processed in the SIP stack of the modem processor. If the SIP registration procedure ends, the database between the AP and the modem processor is shared. As the mini SIP stack of the AP transmits a context of the shared modem processor to a Wi-Fi modem, a Wi-Fi handover may be easily performed.

Figure 7:
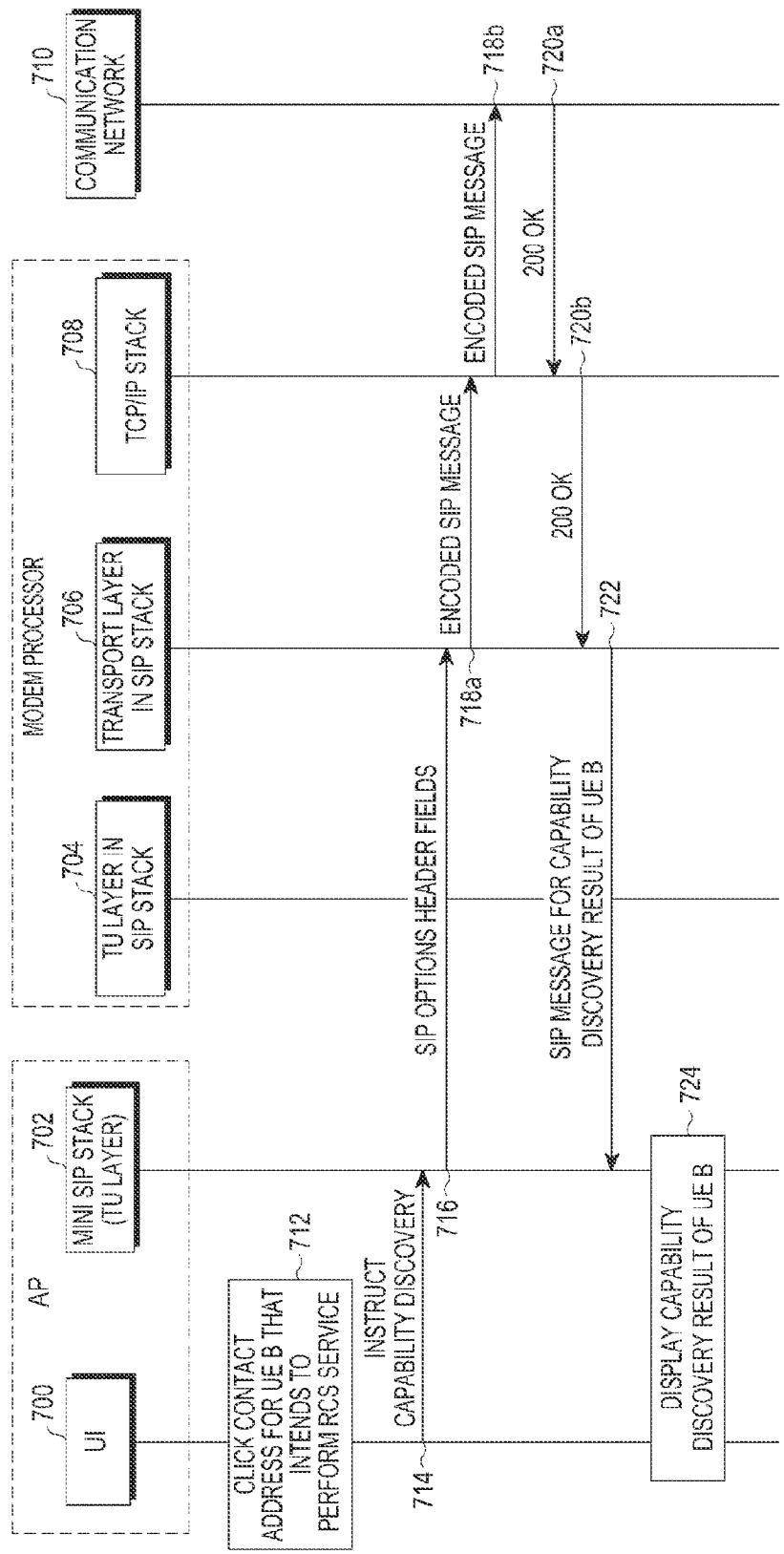
FIG. 7 is a flowchart illustrating an example of an operation of processing an RCS service according to an embodiment of the present disclosure.

FIG. 7 is a flowchart illustrating an example of an operation of processing an RCS service according to an embodiment of the present disclosure. In the examples according to FIG. 7, a UE A uses a mini SIP stack structure in an AP similar to the mini SIP stack structure of the embodiment of FIG. 4.

Referring to FIG. 7, the user of UE A clicks a contact address of a UE B stored in a phone book of the UE A, so that UE A can connect to the UE B of another user. The UI of AP 700 of the UE A recognizes the user's click input in step 712 and transmits an instruction for the capability discovery to a TU layer of the mini SIP stack 702, to identify whether the UE B supports an RCS service, in step 714. The mini SIP stack 702 begins performance of a capability discovery for an RCS service by transmitting an SIP OPTIONS message. More specifically, in step 716, the mini SIP stack 702 transmits SIP OPTIONS header fields to a transport layer 706 of the SIP stack through a TU layer 704 of the SIP stack in the modem processor. Here, the SIP OPTIONS header fields may include capability information of UE A. The transport layer 706 encodes the SIP OPTIONS header fields, such that the SIP OPTIONS header fields may be processed by the TCP/IP stack 708 actually in charge of transmission of data and transmits the encoded SIP OPTIONS header fields to the TCP/IP stack 708, in step 718a. The TCP/IP stack 708, which has received the SIP OPTIONS header fields, provides the encoded SIP OPTIONS header fields to a communication network 710 in step 718b. The communication network 710 provides mobile communication and IMS based multimedia services to UE A and UE B. More specifically, although not illustrated in FIG. 7, the communication network 710 includes a server that performs a call control function of establishing, changing, ending, and accepting a multimedia session through the SIP messages received from a plurality of UEs, and a registration server that performs registration of a location of the corresponding UE.

The communication network 710 identifies a capability for the UE B and identifies whether an RCS service requested by the UE A may be provided, and when the identifications are successfully performed, may transmit an acceptance for the identification for the request to the TCP/IP stack 708 of the modem processor using a 200ok message, in step 720a. The 200ok message may include tag information notifying of the type of an RCS service that may be used by UE B. Although not illustrated, if a response to the capability discovery and the type of an RCS service that may be used by UE B are acquired by decoding the 200ok message through an SIP parser included in the modem processor, the TCP/IP stack 708 of the modem processor transmits the acquired response and type of the RCS service to a transport layer 706 of the SIP stack, in step 720b. Then, in step 722, the transport layer 706 transmits the response to the capability discovery and the type of the RCS service that may be used by UE B to the TU layer 702 the mini SIP stack 702 of the AP, in the form of an SIP message, through the TU layer 704 of the SIP stack. In step 724, the AP 700 displays the results of the identified capability discovery for the UE B through the display screen of UE A. The displayed results may include information indicating that the UE B is a terminal through which an RCS service may be used, and/or may additionally include the types of RCS services that may be used by the UE B. If the user is asked whether a display will be performed and a user input corresponding to an acceptance is recognized through the UI, the types of RCS services that may be used by the UE B may be displayed.

Thereafter, although not illustrated, the mini SIP stack 702 of the AP processes application data for the corresponding RCS service, and the processed data is transmitted to the TU layer 704 of the SIP stack. Then, the TU layer 704 transmits the data to another layer. Further, although not illustrated, the SIP parser included in the modem processor encodes the SIP message received through the mini SIP stack 702 of the AP and transmits the encoded SIP message to the mobile communication network 710 through the TCP/IP stack 708.

Meanwhile, when an SIP body, XML code, and/or other similar information corresponding to application data, such as the SDP of a video shared by the AP and the modem processor exist, the mini SIP stack 702 of the AP processes encoding and decoding of the SIP, the XML code, and/or the other similar information.

Figure 8:
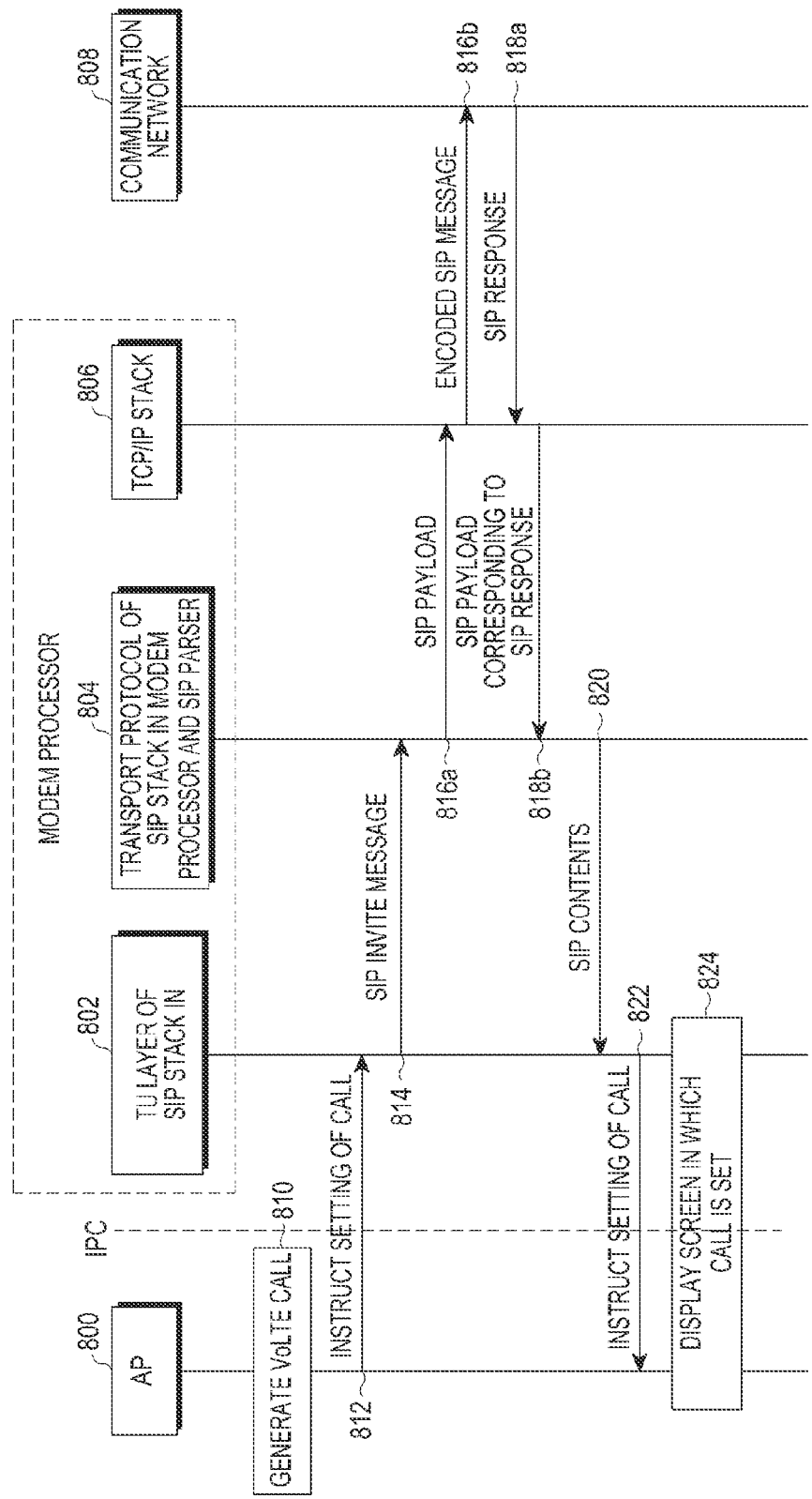
FIG. 8 is a flowchart illustrating an example of an operation of processing a VoLTE service according to an embodiment of the present disclosure.

FIG. 8 is a flowchart illustrating an example of an operation of processing a VoLTE service according to an embodiment of the present disclosure.

Referring to FIG. 8, if the AP 800 recognizes a user input from a user for performing a VoLTE call in step 810, the AP 800 transmits an instruction for setting the VoLTE call to the TU layer 802 of the SIP stack of the modem processor, in step 812. Then, in step 814, the TU layer 802 generates an INVITE message and transmits the generated INVITE message to the transport layer 804 of the SIP stack in the modem processor. Then, the SIP parser acquires an SIP payload corresponding to the INVITE message transmitted to the transport layer 804, and transmits the acquired SIP payload to the TCP/IP stack 806 through the transport layer 804 in 816a. In step 816b, the TCP/IP stack 806 configures the SIP payload in the form in which the SIP payload may be actually transmitted to a communication network 808, and transmits the SIP payload to the communication network 808. The communication network 808 identifies whether the VoLTE call will be accepted from a transmission target of the VoLTE call and configures a response instructing the identified acceptance in the form of an SIP message, and transmits the configured response to the transport layer 804 through the TCP/IP stack 806 in steps 818a and 188b. Then, an SIP parser configures SIP contents corresponding to the response from the payload of the SIP message, and the configured SIP contents are transmitted to the TU layer 802, in step 820. In the present example, the SIP response represents an acceptance of the VoLTE call. The SIP contents are transmitted to the AP 800 in step 822/The AP 800 transmits an instruction for setting of the VoLTE call to the TU layer 802 of the modem processor and a screen corresponding to the set VoLTE call is provided to the user through a display screen, in step 824.

In the embodiment according to FIG. 8, the AP 800 and the modem processor (in particular, the TU layer 802 of the modem processor) communicate via Inter-Process Communication (IPC).

A plan of selectively managing an SIP stack of an AP and an SIP stack of a modem processor according to a network accessed by a UE, according to another embodiment of the present disclosure is described as follows.\

Figure 9A:
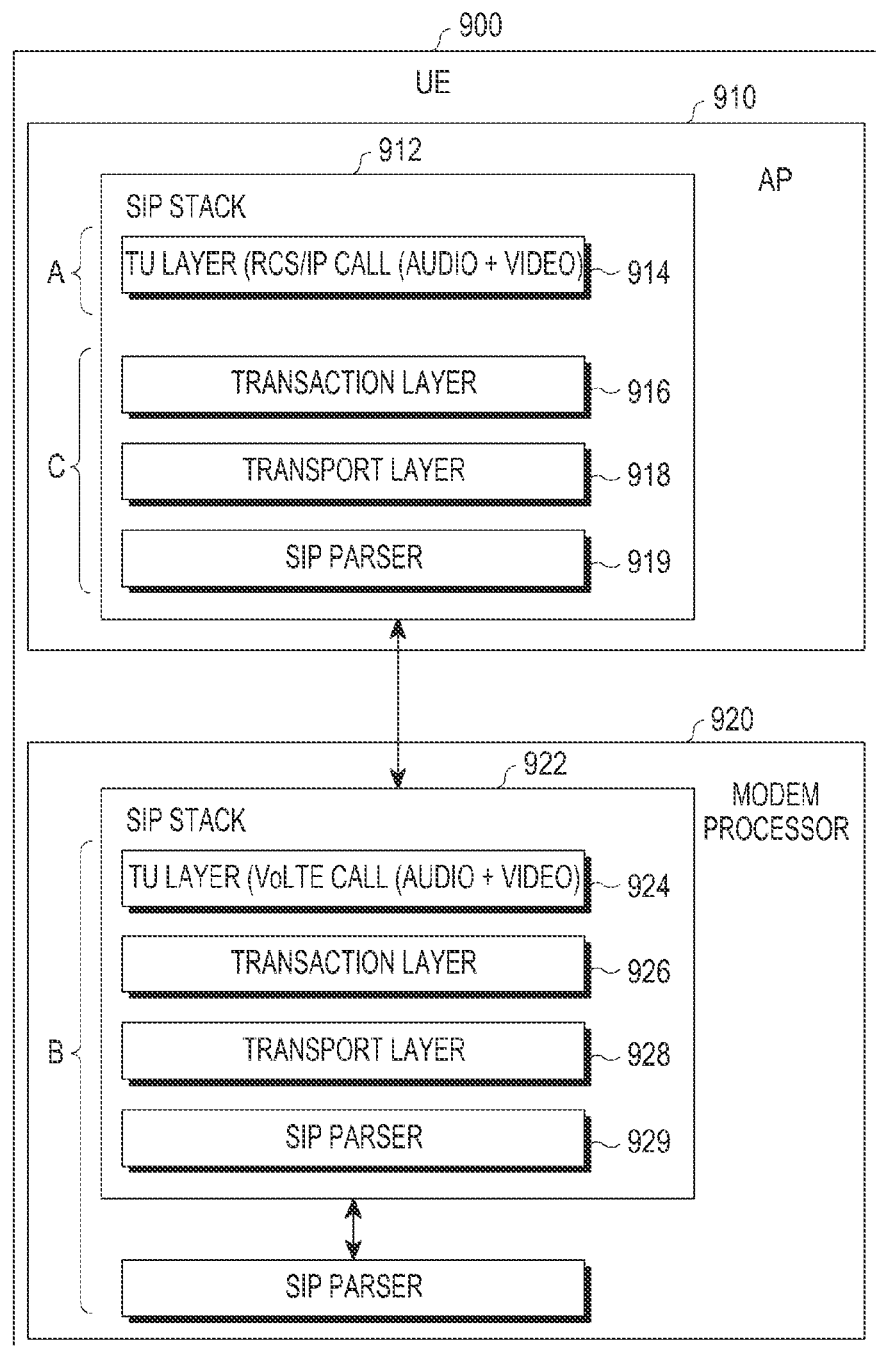
FIG. 9A is a diagram illustrating an example of a configuration of a UE that selectively manages SIP stacks depending on an access network according to another embodiment of the present disclosure.

FIG. 9A is a diagram illustrating an example of a configuration of a UE that selectively manages SIP stacks depending on an access network according to another embodiment of the present disclosure.

Referring to FIG. 9A, a UE 900 includes an AP 910 and a modem processor 920. The AP 910 includes an SIP stack 912, and the modem processor 920 includes an SIP stack 922. According to another embodiment of the present disclosure, the SIP stacks 912 and 922 are selectively managed according to a network to which the UE 900 accesses. In the present example, the UE 900 is handed over to Wi-Fi while currently accessing a mobile communication network. Here, the mobile communication network may include, for example, communication networks that provide 2G, 3G, and LTE based mobile communications. If the AP 910 recognizes that the UE 900 is currently connected to a Wi-Fi network, the SIP stack 912 is fully managed. Meanwhile, the UE 900 uses a TU layer 914 regardless of a network currently accessed by the UE 900, in order to process an RCS service and an IP based call of the SIP stack 912. The remaining layers of the SIP stack 912 (i.e., a transaction layer 916, a transport layer 918, and an SIP parser 919) are only operated when the UE 900 accesses a Wi-Fi network.

When the UE 900 accesses the Wi-Fi network, the TU layer 914 of the AP 910 is synchronized with a TU layer 924 of the modem processor 920, and the SIP stack 922 of the modem processor 920 stops operations performed by the remaining layers (i.e., a transaction layer 926, a transport layer 928, and an SIP parser 929).

Figure 9B:
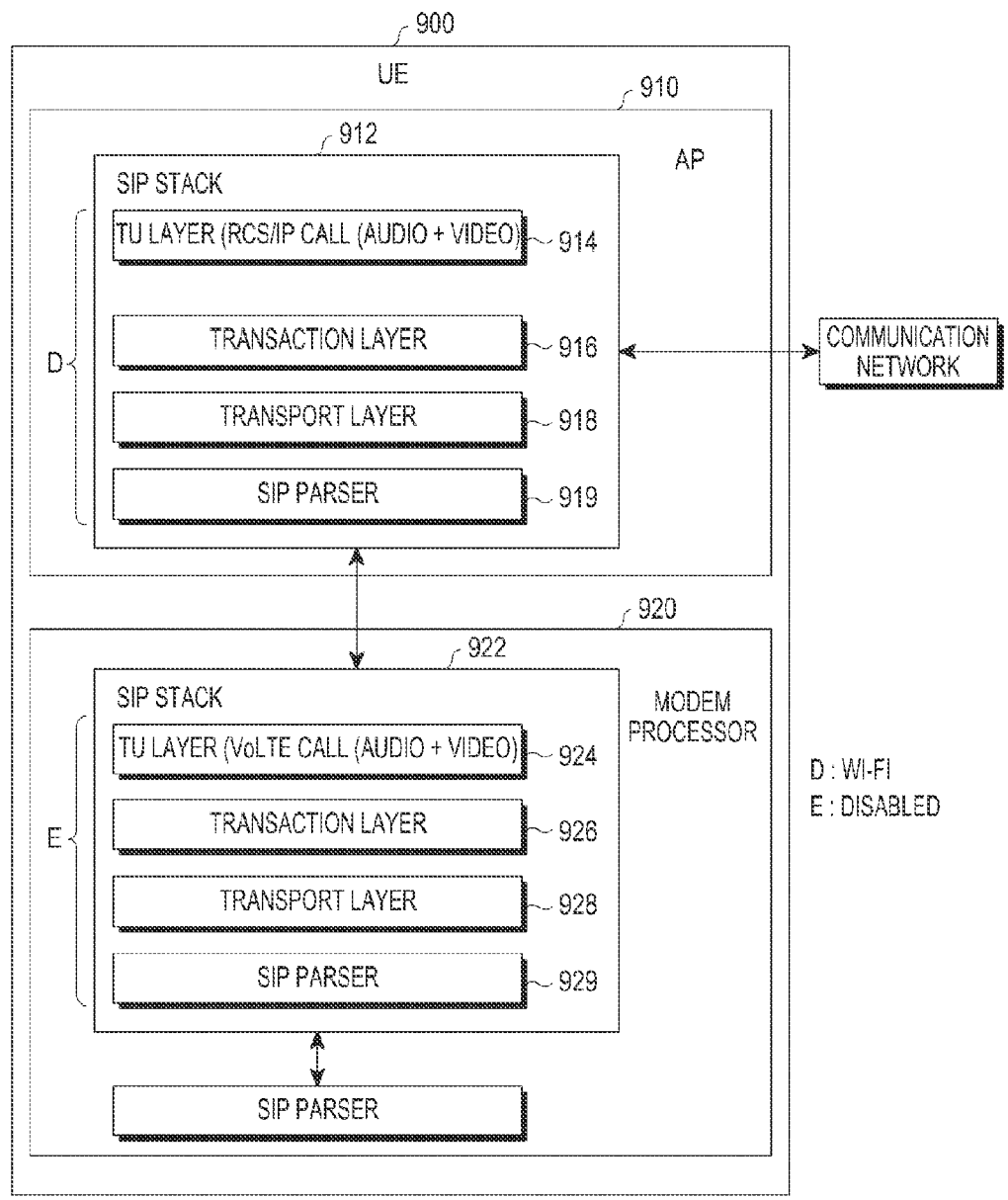
FIG. 9B is a diagram illustrating management states of SIP stacks of a UE that accesses Wi-Fi according to another embodiment of the present disclosure.

FIG. 9B is a diagram illustrating management states of SIP stacks of a UE that accesses Wi-Fi according to another embodiment of the present disclosure.

Referring to FIG. 9B, in the UE 900, an operation of the SIP stack 922 of the modem processor 920 is fully stopped. By contrast, the SIP stack 912 of the AP 910 is fully managed. If transmission of a registration related context is required, the AP 910 will share the SIP stack 912 with the modem processor 920. The AP 910 may configure an IP call using context information shared by the modem processor 920.

Thereafter, if the UE 900 recognizes that the UE 900 is currently accessing a mobile communication network, the SIP stack 922 of the modem processor 920 is fully managed.

Figure 10:
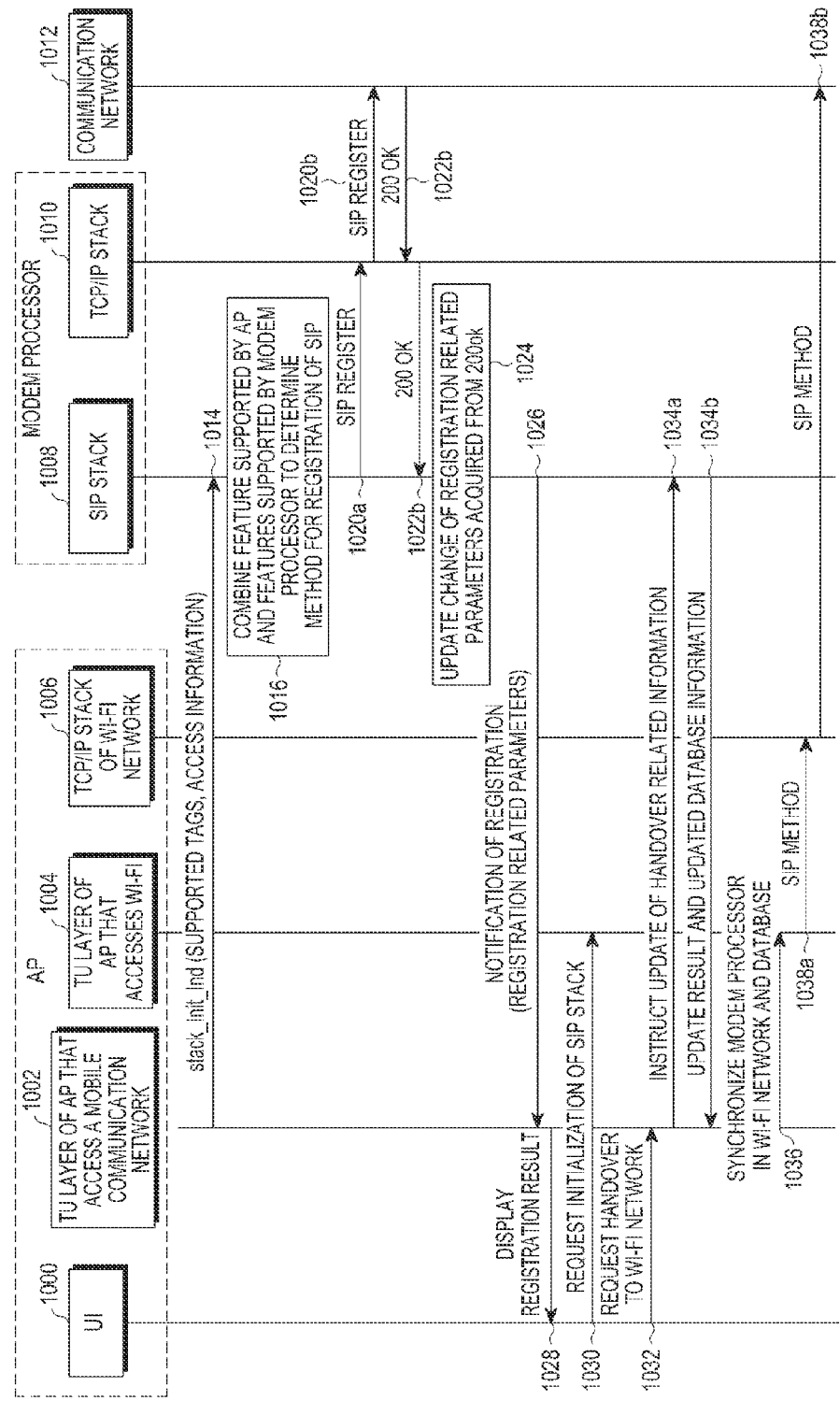
FIG. 10 is a flowchart illustrating an example of an operation of transmitting a context while the UE operated as illustrated in FIGS. 9A and 9B is handed over to a Wi-Fi network according to an embodiment of the present disclosure.

FIG. 10 is a flowchart illustrating an example of an operation of transmitting a context while the UE operated as illustrated in FIGS. 9A and 9B is handed over to a Wi-Fi network according to an embodiment of the present disclosure.

Referring to FIG. 10, a TU layer 1002 of an AP that is currently accessing a mobile communication network transmits, to a modem processor, a Stack_Init_Ind instructing the modem processor to initialize an SIP stack to the SIP stack 1008 of the modem processor in step 1014. Here, the Stack_Init_Ind message may include tags for the features supported by the AP and access information. In step 1016, the SIP stack 1008 of the modem processor combines the features supported by the SIP stack 1008 and the features supported by the AP using the tags to determine a method for registration of an SIP. Here, the method for registration of an SIP includes an operation of determining authentication and Ipsec associations. In steps 1020*a* and 1020*b*, the SIP stack 1008 transmits an SIP REGISTER message to a communication network 1012 through a TCP/IP stack 1010. Thereafter, in steps 1022*a* and 1022*b*, a response to the SIP REGISTER message transmitted from the communication network 1012 is received by the SIP stack 1008 through the TCP/IP stack 1010. Next, the SIP stack 1008 updates registration information acquired from the SIP REGISTER message and related parameters in a database, in step 1024 and transmits a registration notification including the parameter (i.e., an IMS_REG_NTF message) to the TU layer 1002 of the AP, in step 1026. In step 1028, a UI of 1000 the AP displays a result of the registration through a display screen.

Thereafter, the AP recognizes a user input that instructs the AP to access a Wi-Fi network. In step 1030, the UI of the AP 1000 transmits a Stack_Init_Ind message to the TU layer 1004 of the AP that accesses Wi-Fi through the TU layer 1002 of the AP that accesses the mobile communication network. For convenience of description, although, in the example illustrated in FIG. 10, the TU layer 1002 of the AP accesses the mobile communication network and the TU layer 1004 of the AP accesses the Wi-Fi network, the TU layers 1002 and 1004 substantially correspond to the TU layer constituting the SIP stack of the AP, and accordingly, the TU layers 1002 and 1004 may be driven regardless of an accessed network. In step 1032, the UI of the AP 1000 transmits a request for a handover to Wi-Fi, to the TU layer 1002 that is accessing a mobile communication network. The TU layer 1002 instructs the SIP stack 1008 of the modem processor to update information on the handover in a database in step 1034*a*, and receives the updated database information from the SIP stack 1008 in step 1034*b*.

In step 1036, the TU layer 1002 that is accessing the communication network synchronizes the TU layer 1004 that accessed Wi-Fi and the database. In steps 1038*a* and 1038*b*, the TU layer 1004 transmits an SIP method to the communication network 1012 through the TCP/IP stack 1006 of the Wi-Fi network.

In summary, whenever a new registration is generated in the UE or a registration state of the UE is changed, the AP updates registration database details in the CP. Furthermore, even when the network state is changed, the AP transmits the updated changes of the registration details to the modem processor to share the updated database. When the UE is handed over to Wi-Fi, the AP synchronizes data of a voice service using the database updated by the modem processor. The AP independently initializes all features through Wi-Fi.

Meanwhile, the modem processor processes, for example, only some applications such as a VoLTE based application through the TU layer of the SIP stack. Therefore, the modem processor may include a MUltipleXer (MUX) that makes a control such that a TU layer is enabled only for an application that may be processed.

Figure 11:
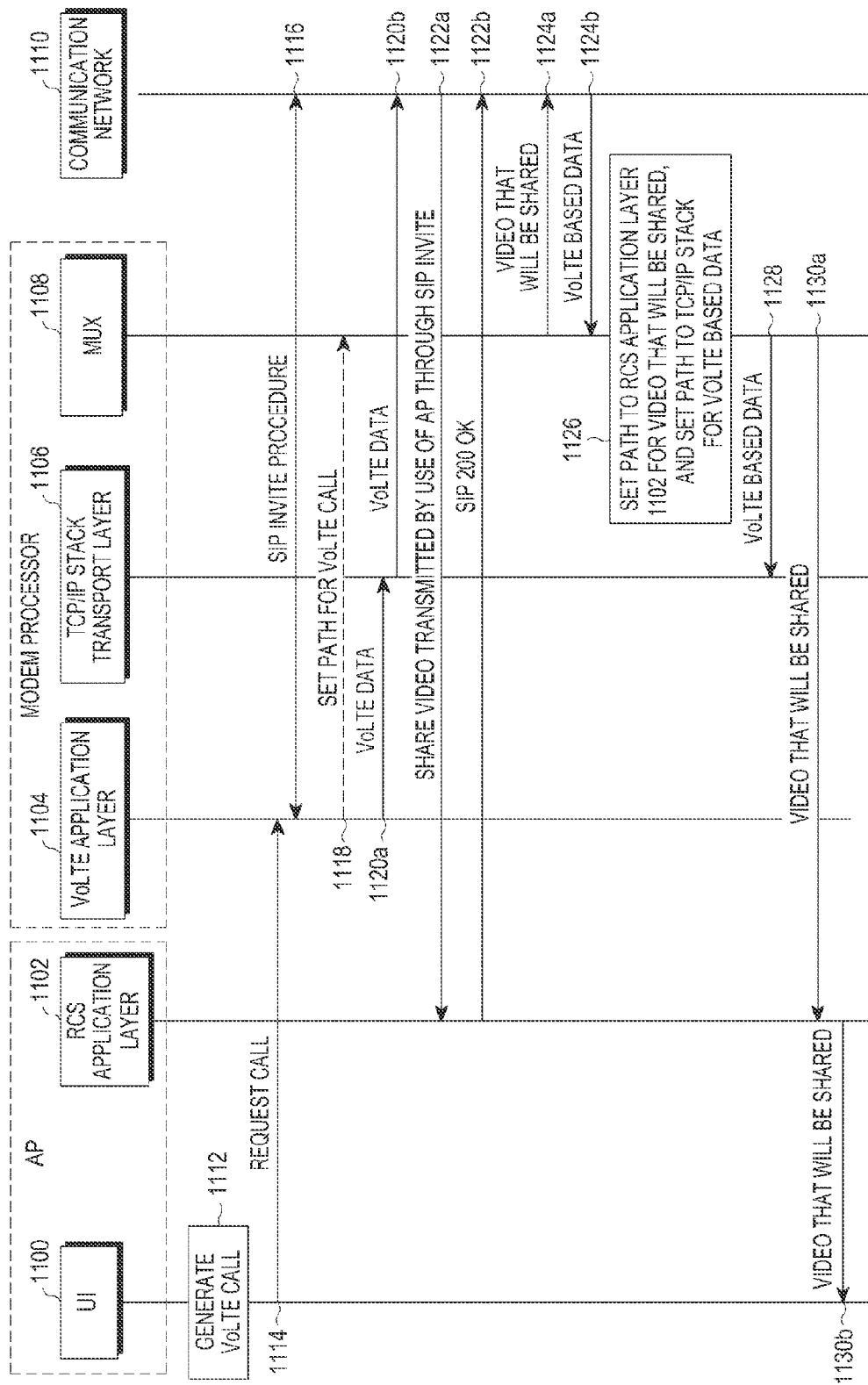
FIG. 11 is a diagram illustrating an example of data routing processed by a UE according to another embodiment of the present disclosure.

FIG. 11 is a diagram illustrating an example of data routing processed by a UE according to another embodiment of the present disclosure.

Referring to FIG. 11, the UI 100 of an AP receives a user input that generates a VoLTE call, in step 1112, and a request for setting the VoLTE call is transmitted to a VoLTE application layer 1104 of the modem processor, in step 1114. Then, in step 1116, the VoLTE application layer 1104 performs an SIP INVITE procedure for setting the VoLTE call with a communication network 1110. The SIP INVITE procedure is the same as the SIP INVITE procedure of FIG. 8, and therefore a further detailed description thereof is omitted.

In step 1118, the VoLTE application layer 1104 selectively allows the MUX 1108 to set a path of data for the VoLTE application to the VoLTE application layer 1104. In steps 1120*a* and 1120*b*, the VoLTE application layer 1104 of the modem processor transmits VoLTE based data to the communication network 1110 through the TCP/IP stack 1106.

Meanwhile, in the present example, the RCS application layer 1102 receives a request for sharing of a video from another user through the communication network in step 1122*a*, an acceptance is determined for the request for sharing of the video and transmitted to the communication network 1110, in step 1122*b*. Here, a request to share a video and a response are configured using an SIP message, and is the same as an operation of processing an RCS service described in FIG. 7, and accordingly, a further detailed description thereof is omitted.

In the present example, a video that will be shared by the MUX 1108 and VoLTE based data are received through steps 1124*a* and 1124*b*. As described above, the MUX 1108 is configured such that paths of RCS based data and VoLTE based data are classified according to an embodiment of the present disclosure. The paths may be set in the UE in advance according to the embodiment of the present disclosure, may be set through a separate user input, or may be set when corresponding data is generated as in step 1118.

Then, in step 1126, the MUX 1108 identifies predetermined paths for the corresponding data. Furthermore, according to the identified path, the VoLTE based data is transmitted to the TCP/IP stack 1106 to transmit the VoLTE based data to the VoLTE application layer 1104 in step 1128. In steps 1130*a* and 1130*b*, the data that will be shared is transmitted to the UI 1100 of the AP through the RCS application layer 1102. Then, the UI 1100 of the AP outputs the data that will be shared on a display screen according to a user input or settings stored in advance.

While the present disclosure has been particularly shown and described with reference to certain embodiments thereof, it will be understood by those of ordinary skill in the art that various changes in form and details may be made therein without departing from the scope of the present disclosure, as defined by the following claims and their equivalents.

What is claimed is:

1. A mobile terminal for supporting Rich Communication Suite (RCS) and Voice Over Long Term Evolution (VoLTE) based services, the mobile terminal comprising:
   an application processor that enables a first layer of a first session connection protocol stack and transmits signaling for an RCS service to a modem processor; and
   the modem processor that comprises a second session connection protocol stack for connecting a session, and that transmits, to a communication network, the signaling for the RCS service transmitted through the first layer.

2. The mobile terminal of claim 1, wherein the signaling for the RCS service comprises a request for registration of the mobile terminal, or a Session Initiation Protocol (SIP) OPTIONS message for a capability discovery of the RCS service.

3. The mobile terminal of claim 1, wherein, when the mobile terminal is handed over to a Wi-Fi network, all layers of the first session connection protocol stack are enabled and share a database with the second session connection protocol stack.

4. The mobile terminal of claim 3, wherein all layers of the second session connection protocol stack are disabled.

5. The mobile terminal of claim 1, wherein, when the mobile terminal accesses a mobile communication network, all layers of the second session connection protocol stack are enabled.

6. The mobile terminal of claim 1, wherein, when first data based on the RCS service is generated, a path of the first data is transmitted to the application processor, and
wherein, when second data based on the VoLTE service is generated, the mobile terminal further comprises a MUltipleXer (MUX) that sets a path of the second data to be transmitted to the modem processor.

7. The mobile terminal of claim 1, wherein the first layer is a transaction layer, and the signaling for the RCS service is transparently transmitted to the transaction layer of the second session connection protocol stack.

8. A method of supporting Rich Communication Suite (RCS) and VoLTE based services, the method comprising:
enabling, by an application processor, a first layer of a first session connection protocol stack;
transmitting, by the application processor, to a modem processor, signaling for an RCS service; and
transmitting, by the modem processor, the signaling for the RCS service to a communication network through a second session connection protocol stack for connecting a session.

9. The method of claim 8, wherein the signaling for the RCE service comprises a request for an Internet Protocol (IP) Multimedia Subsystem (IMS) registration of a mobile terminal that includes the application processor and the modem processor, or a Session Initiation Protocol (SIP) OPTIONS message for a capability discovery of the RCS service.

10. The method of claim 9, further comprising:
enabling, when a mobile terminal that includes the application processor and the modem processor is handed over to a Wi-Fi network, all layers of the first session connection protocol stack; and
sharing a database with the second session connection protocol stack.

11. The method of claim 9, wherein all layers of the second session connection protocol stack are disabled.

12. The method of claim 9, further comprising, when a mobile terminal that includes the application processor and the modem processor accesses a mobile communication network, enabling all layers of the second session connection protocol stack.

13. The method of claim 9, further comprising:
when first data based on the RCS service is generated, transmitting a path of the first data to the application processor; and
when second data based on the VoLTE service is generated, transmitting a path of the second data to the modem processor.

14. The method of claim 9, wherein the first layer is a transaction layer, and the signaling is transparently transmitted to the transaction layer of the second session protocol stack.

15. A chipset for supporting Rich Communication Suite (RCS) and Voice Over Long Term Evolution (VoLTE) based services, the chipset comprising:
an application processor that enables a first layer of a first session connection protocol stack and transmits signaling for an RCS service to a modem processor; and
the modem processor that comprises a second session connection protocol stack for connecting a session, and that transmits, to a communication network, the signaling for the RCS service transmitted through the first layer.

16. The chipset of claim 15, wherein the signaling for the RCS service comprises a request for an Internet Protocol (IP) Multimedia Subsystem (IMS) registration of the mobile terminal, or a Session Initiation Protocol (SIP) OPTIONS message for a capability discovery of the RCS service.

17. The chipset of claim 15, wherein when a device including the chipset is handed over to a Wi-Fi network, all layers of the first session connection protocol stack are enabled and share a database with the second session connection protocol stack.

18. The chipset of claim 17, wherein all layers of the second session connection protocol stack are disabled.

19. The chipset of claim 15, wherein a device including the chipset accesses a mobile communication network, all layers of the second session connection protocol stack are enabled.

20. The chipset of claim 15, wherein first data based on the RCS service is generated, a path of the first data is transmitted to the application processor, and
wherein second data based on the VoLTE service is generated, the modem processor includes a MUltipleXer (MUX) that sets a path of the second data are transmitted to the modem processor.

* * * * *